(12) United States Patent
Deck et al.

(10) Patent No.: US 7,456,950 B2
(45) Date of Patent: Nov. 25, 2008

(54) SPECTROSCOPE WITH SPATIAL RESOLUTION CONTROL

(75) Inventors: Francis J. Deck, Madison, WI (US); John Magie Coffin, Blue Mounds, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 0 days.

(21) Appl. No.: 11/846,508

(22) Filed: Aug. 28, 2007

(65) Prior Publication Data

US 2008/0049293 A1    Feb. 28, 2008

Related U.S. Application Data

(60) Provisional application No. 60/840,901, filed on Aug. 28, 2006, provisional application No. 60/840,759, filed on Aug. 28, 2006.

(51) Int. Cl.
*G01J 3/02* (2006.01)
*G02B 17/00* (2006.01)

(52) U.S. Cl. .................. 356/300; 356/326; 250/339.07; 359/350

(58) Field of Classification Search ................. 356/300, 356/326, 328
See application file for complete search history.

(56) References Cited

U.S. PATENT DOCUMENTS

| | | | | |
|---|---|---|---|---|
| 5,587,832 A | * | 12/1996 | Krause | ....................... 359/385 |
| 5,978,095 A | * | 11/1999 | Tanaami | ..................... 356/445 |
| 2002/0033452 A1 | | 3/2002 | Hoult et al. | |
| 2002/0034000 A1 | | 3/2002 | Hoult et al. | |
| 2006/0202124 A1 | | 9/2006 | Hoult et al. | |

* cited by examiner

*Primary Examiner*—F. L Evans
(74) *Attorney, Agent, or Firm*—Charles B. Katz; Michael C. Staggs

(57) ABSTRACT

In a spectrometer, preferably in a spectrometric microscope, light from a specimen is collected at a collector objective element and delivered to a camera element, which in turn provides the light to a photosensitive detector. A focal plane is provided between the collector objective element and the camera element, and one or more aperture arrays may be situated in the focal plane to restrict the detector's field of view of the specimen to the areas within the apertures. By utilizing aperture arrays with apertures of different sizes and shapes, the spatial resolution of the spectrometer readings may be varied without the need to vary the optics of the spectrometer. As a result, if the optics are optimized to minimize vignetting, spatial resolution may be varied without adverse increases in vignetting.

24 Claims, 1 Drawing Sheet

SPECTROSCOPE WITH SPATIAL RESOLUTION CONTROL

CROSS-REFERENCE TO RELATED APPLICATIONS

This application claims priority under 35 USC §119(e) to U.S. Provisional Patent Applications 60/840,759 and 60/840,901, both filed on 28 Aug. 2006, the entireties of which are incorporated by reference herein.

FIELD OF THE INVENTION

This document concerns an invention relating generally to spectroscopes, and more particularly to spectroscopes and spectroscopic imaging microscopes which compensate for optical vignetting effects in such a manner that measurement quality, and/or the ability to adjust spatial resolution of measurements, is enhanced.

BACKGROUND OF THE INVENTION

A molecular spectrometer (sometimes referred to as a spectroscope) is an instrument wherein a solid, liquid, or gaseous specimen is illuminated, often with non-visible light, such as light in the infrared region of the spectrum. The light from the specimen is then captured and analyzed to reveal information about the characteristics of the specimen. As an example, a specimen may be illuminated with infrared light having known intensity across a range of wavelengths, and the light transmitted and/or reflected by the specimen can then be captured for comparison to the illuminating light. Review of the captured spectra (i.e., light intensity vs. wavelength data) can then illustrate the wavelengths at which the illuminating light was absorbed by the specimen, which in turn can yield information about the chemical bonds present in the specimen, and thus its composition and other characteristics. To illustrate, libraries of spectra obtained from reference specimens of known composition are available, and by matching measured spectra versus these reference spectra, one can then determine the composition of the specimens from which the measured spectra were obtained.

Two common types of spectrometers are dispersive spectrometers and Fourier Transform (FT) spectrometers. In a dispersive spectrometer, a range of input light wavelengths are supplied to a specimen, and the output light from the specimen is received by a monochromator—a device which breaks the output light into its component wavelengths—with one or more detectors then measuring light intensity at these output wavelengths to generate the output spectrum. In an FT spectrometer, an interferometer is used to supply an interferogram—a time-varying mixture of several input light wavelengths—to a specimen, and one or more detectors measure the (time-varying) output light from the specimen. The various wavelengths of the output light can then be "unscrambled" using mathematical techniques, such as the Fourier Transform, to obtain the intensity of the output light at its component wavelengths and thereby generate the output spectrum.

Spectroscopic microscopes then usefully incorporate the ability to make spectroscopic measurements into an optical microscope. A user may therefore use a spectroscopic microscope to view an image of a region of interest on a specimen (usually in magnified form), and also to obtain spectroscopic data from one or more locations on the region of interest. The spectroscopic measurements are often obtained by capturing spectroscopic data along a 1-dimensional row of areas on the region of interest (i.e., at areas spaced along a line on the region of interest), and then repeatedly capturing spectroscopic data from adjacent 1-dimensional rows. In other words, the linear array of spectroscopically-sampled areas is stepped sideways to ultimately capture spectroscopic data over a 2-dimensional array of areas over the region of interest. As a result, the user can view an image of the region of interest, and can also review the spectra (and thus the composition) of the specimen over the region of interest.

An important issue for users is the spatial resolution of a spectroscopic microscope, i.e., the size of the area over which each spectroscopic measurement is taken. Since each spectroscopic measurement from an area effectively provides the spectra of all substances present in the area (or at least the spectra of those substances which are responsive to the incident light), a spectroscopic measurement over a large area can be "coarse": it can reflect the presence of numerous substances, though a user may not be able to visually assign each detected substance to a particular area seen through the microscope. In other words, while a user might see an area and spectroscopically determine the presence of certain substances, a user might not know where each substance specifically resides on the area—and such information can be highly useful. In contrast, a spectroscopic measurement taken over a smaller area can provide the desired information, since the location of the detected substance(s) is more specifically located. However, spectroscopic measurements captured over a smaller area tend to have a lower signal-to-noise ratio (i.e., they are noisier). This is largely because less light can practically be detected from a smaller area, and the lesser detected light leads to lower signal levels. A user can compensate for a lower signal-to-noise ratio by increasing the exposure time (i.e, the time over which the area is illuminated, and over which light is detected therefrom), and/or by taking multiple exposures from the area and combining them (e.g., averaging them), which tends to attenuate the effect of noise. These procedures require greater measurement time, which is also undesirable from the user's standpoint.

Because of the foregoing tradeoff between spatial resolution and signal-to-noise ratio, it is useful for users to have variable resolution in a spectroscopic microscope—in effect, the ability to shift between coarse resolution wherein spectral measurements are taken over larger areas, and fine resolution wherein spectral measurements are taken over smaller areas. An example of such an arrangement is illustrated in published U.S. Patent Appln. 2002/0034000 to Hoult et al., and in its associated U.S. Patent Appln. 2002/0033452 to Hoult et al. In these references, variable resolution is provided by inserting a set of magnifying optics within the light path between the specimen and the spectroscopic detector. The problem with this approach is that it introduces yet another drawback: "vignetting," a condition wherein the light from the area(s) under analysis on the specimen is non-uniformly supplied to the spectroscopic detector. If one considers that the detector effectively receives a projected optical image of each area under analysis, vignetting usually involves the problem that the center of the projected image of the area is bright—the integrity of the image is preserved—but the brightness decreases toward the edges of the image. Vignetting therefore leads to the problem that the spectrometric measurements from the specimen area are skewed, with the nonuniform illumination across the received image providing higher signal levels nearer the center of the image/area, and diminished signal levels near the edges of the image/area. As a result, the spectra from the substance(s) at the center of the area/image are more strongly represented in the area's spectroscopic measurements than the substance(s) nearer the edges of the image/area. More generally, vignetting leads to less than optimal signal strength owing to the loss in light near the edges of the image/area. Vignetting tends to arise as a side-effect from the use of "off-angle" arrangements of optical elements, i.e., from reflection or refraction of light at angles to the optical axis of the lenses and/or mirrors used for the microscope optics (at least those lenses/mirrors used to perform spectroscopic measurement functions). The use of greater off-axis angles tend to lead to greater vignetting, and thus greater reductions in image luminance and signal strength, because light is lost as it "leaks" from the usable areas (the apertures) of successive optical elements. In a spectroscopic microscope, it is often possible to adapt the optics so that vignetting is minimized for one of the resolution/magnification settings, but this then tends to enhance vignetting in the other settings as additional optics are introduced to enable the settings. It would therefore be useful to have a means for reducing the effects of vignetting in spectrometers and spectroscopic microscopes, and to allow the use of variable spatial resolution settings with reduced vignetting effects.

SUMMARY OF THE INVENTION

The invention involves spectroscopic devices and methods which are intended to at least partially solve the aforementioned problems, and which can be beneficially implemented in spectroscopic microscopes. To give the reader a basic understanding of some of the advantageous features of the invention, following is a brief summary of preferred versions of the devices and methods, with reference being made to the accompanying drawing to enhance the reader's understanding. Since this is merely a summary, it should be understood that more details regarding preferred versions of the invention may be found in the Detailed Description set forth elsewhere in this document. The claims set forth at the end of this document then define the various versions of the invention in which exclusive rights are secured.

The accompanying drawings present a schematic of an exemplary spectroscope which incorporates features of the invention, with the spectroscope being generally denoted with the reference numeral 100. The spectroscope has a specimen stage 10 suitable for bearing a specimen to be analyzed, illumination components for illuminating the specimen (generally designated at 200), and collection components for collecting spectroscopic measurements from the illuminated specimen (these components being generally designated by 300). On the illumination side 200 of the device 100, a light source 202 (shown in phantom), such as an interferometer emitting modulated infrared light, has a source output aperture 204 from which light is emitted, with the emitted light preferably being defined by a collimated output light beam. One or more intermediate source optical elements (i.e., reflectors, lenses, or the like)—here focusing reflectors 206, 208, and 210, and planar folding reflectors 212, 214, and 216—then pass the light from the light source 202 to a source objective optical element 218. The source objective element 218 is preferably a Schwarzschild objective, and is thus illustrated with a convex reflector 218x receiving light from the light source 202, and a concave reflector 218c receiving light from the convex reflector 218x and forwarding the light to the specimen stage 10. In this arrangement, the intermediate source optical elements (more particularly elements 206, 208, and 210) preferably magnify the source output aperture 204 of the light source 202 to at least substantially match the limiting aperture of the source objective element 218 (with the limiting aperture here being the working reflective area of the convex reflector 218x). Since the source output aperture 204 for the illumination side 200 is imaged to the limiting aperture of the source objective element 218, light is not lost about the perimeter of the convex reflector 218x of the source objective element 218 (or from the perimeters of any of the intermediate source optical elements 206, 208, and 210, 212, 214, and 216), and light is transmitted between the light source 202 and the specimen stage 10 with high efficiency (low loss). While the magnification of the source output aperture 204 reduces the size of the light beam as it travels to the source objective element 218, the overall illumination area at the specimen stage 10 is still effectively increased.

On the collection side 300 of the spectroscope 100, a collector objective optical element 302 then receives the light from the specimen stage 10. The collector objective element 302 is also preferably a Schwarzschild objective, with a concave reflector 302c receiving the light and directing it to a convex reflector 302x (with this reflector 302x defining the limiting aperture of the collector objective element 302). The light from the collector objective element 302 is then supplied to intermediate collector optical elements, namely planar folding reflectors 304 and 306 and focusing reflector 308, as well as through an aperture array 310 (which will be discussed at greater length below). A camera optical element 312 then receives the light, and is again preferably a Schwarzschild objective with a convex reflector 312x receiving the light (and defining a camera limiting aperture) and directing it to a concave reflector 312c. The light is then delivered to an image plane along which a detector 314 is aligned, with the detector 314 preferably being a multi-element detector (i.e., a detector array). In a manner similar to the arrangement at the illumination side 200, the intermediate collector optical elements 304, 306, and 308 (and in particular the focusing reflector 308) preferably adapt the light from the collector objective element 302 such that it has a diameter at least substantially matching the camera limiting aperture (the working area of convex reflector 312x) when received thereon. Thus, light loss is reduced on the collection side 300 as well, with the efficient transmission of light from the light source 202 to the source objective element 218 in the illumination side 200 being continued in the collection side 300 from the collector objective element 302 to the camera element 312. As a result, light throughput to the specimen 10 is high, and light transmission from the specimen 10 to the detector 314 is also high, reducing the effects of light loss from vignetting and allowing the collection of higher-strength signals at the detector 314.

In addition, the optical elements of the illumination side 200 are preferably selected such that the source output aperture 204 is at least substantially critically imaged to the source objective element 218 (and thus to the specimen at the specimen stage 10)—in other words, the light rays from each point on the light source 202 are directed to corresponding points on the convex reflector 218x, thereby preserving the image of the light source 202 on the convex reflector 218x. Similarly, the optical elements of the collection side 300 are preferably selected so that the specimen 10 is at least substantially critically imaged to the detector 314 (i.e., so that the collector objective limiting aperture 302x is at least substantially critically imaged to the camera limiting aperture 312x). Such critical imaging will directly image a selected region of the light source 202 to a corresponding region on the specimen 10 (e.g., a glowing filament within the light source 202), and will also directly image the specimen to the detector 314. This is useful, for example, where a user is interested in studying a particular region of interest on the specimen 10: the user may align this portion with the filament of the light source 202, which represents a particularly bright area of the output beam of the light source 202, to generate higher-intensity light output from the region of interest (and thus higher spectral signal strength). However, diffuse illumination could be used instead, if desired.

Another useful feature of the invention relates to the use of the aperture array 310 to allow variation in spatial resolution. The collector objective element 302 and the intermediate optical element 308 (i.e., the focusing reflector 308) have focal lengths, preferably equal focal lengths, which define a focal plane situated between these elements 302 and 308. The aperture array 310 is situated along this focal plane, and it bears multiple apertures 310a, each of which is preferably identically sized and configured. Each of these apertures 310a receive a portion of the light from the collector objective element 302, i.e., a portion of the image of the specimen 10 (preferably the critical image), and pass it to the camera element 312 and the multi-element detector 314. The detector 314 is aligned such that its elements each receive an image of a portion of the specimen stage 10 from a respective aperture 310a in the aperture array 310, and the detector elements thereby generate spectra which are dependent on the characteristics of the specimen as "seen" within the fields of view defined by the aperture array 310. By providing supplemental aperture arrays 316, 318, etc. which each bear apertures which are differently sized from the apertures in the other aperture arrays, and by placing the desired aperture array 310 within the focal plane between the collector objective element 302 and the intermediate optical element 308, a user may vary the sizes of the regions on the specimen 10 from which spectra are captured, and may thereby vary the spatial resolution of the spectroscope 100. In a preferred arrangement, all aperture arrays 310, 316, 318, etc. are mounted to be interchangeably positionable along the focal plane, as by providing the aperture arrays 310, 316, 318, etc. in a translatable row (as depicted in the drawing) so that a user may index through them to the desired resolution setting. Since spectral resolution may be changed without changing the optical magnification of the spectroscope 100 (and thus without any change in vignetting), so long as the spectroscope 100 is designed with minimal vignetting, it will have minimal vignetting at all spatial resolution settings.

As noted above, the foregoing spectroscope arrangement is usefully provided in a spectroscopic microscope. An exemplary microscope arrangement is also illustrated in the drawing, with a light source 400 (e.g., a light source emitting in the visible spectrum) providing light to the specimen stage 10 and the specimen via the source objective element 218, and with a viewing optical element 402 receiving the resulting light from the specimen via the collector objective element 302. The viewing optical element 402 may take the form of an eyepiece through which a user can view the specimen, and/or it could take the form of the input lens of a video camera or other imaging system. In the exemplary microscope system shown in the drawing, it should be understood that the folding reflectors 216 and 304 are dichroic, and are coated or otherwise treated to reflect the light utilized by the spectroscope (e.g., infrared light) and to pass the light utilized by the microscope optics 402, and thus the folding reflectors 216 and 304 are effectively invisible to the microscope light source 400 and viewing element 402.

Further advantages, features, and objects of the invention will be apparent from the remainder of this document in conjunction with the associated drawings.

DETAILED DESCRIPTION OF PREFERRED VERSIONS OF THE INVENTION

Figure 1:
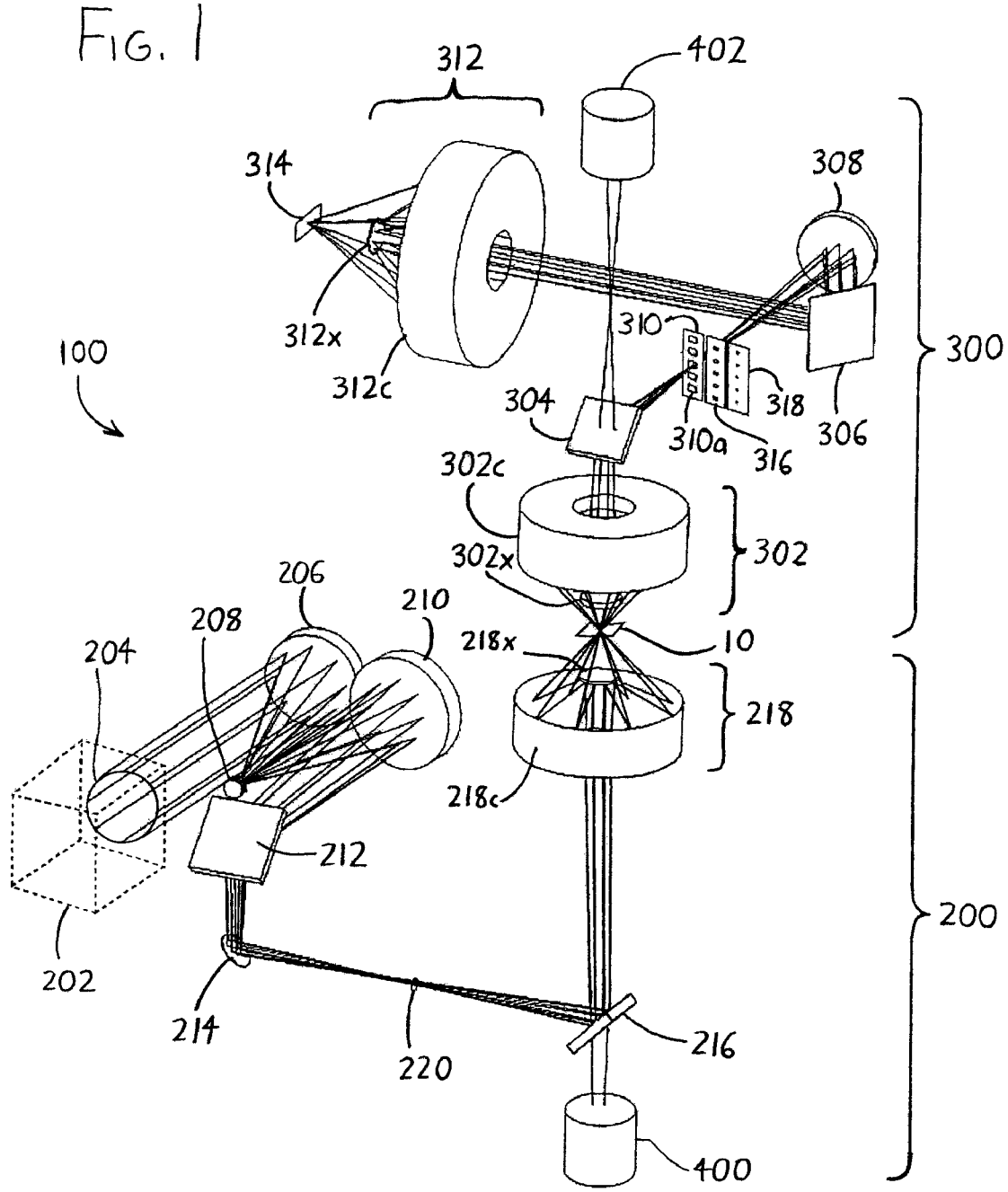
FIG. 1 is a perspective view of an exemplary spectroscopic microscope with illumination elements 200 (including light source 202) illuminating a specimen 10 and collection elements 300 (including detector 314) collecting the resulting signals/images.

To briefly review the foregoing discussion and the exemplary spectroscopic microscope of FIG. 1, input light from the light source 202 is provided to the specimen 10 via the source objective element 218, wherein the aperture of the light source 202 is matched to the aperture of the source objective element 218 via one or more of the intermediate optical elements 206, 208, 210, 212, 214, and 216 to maximize light throughput at the illumination side 200. The light from the specimen 10 is collected at the collector objective element 302, and is delivered to the camera element 312 (and to the detector 314) via one or more of the intermediate optical elements 304, 306, and 308, which similarly match the apertures of the camera element 312 and the collector objective element 302 to maximize light throughput on the collection side 300. As a result, light loss from vignetting effects is reduced and the intensity and uniformity of illumination are improved, thereby enhancing the sensitivity and accuracy of spectral measurements. It is also notable that by minimizing the number of limiting apertures in the device, alignment of the device's optics during routine maintenance and repair becomes significantly easier.

Additionally, an aperture array 310 (and supplemental aperture arrays 316, 318, etc. having differently-sized apertures) may be situated at a focus provided between the collector objective element 302 and the camera element 312. Each aperture 310a is imaged to an element of the detector 314, and limits the field of view of the detector 314 at a corresponding region of the specimen 10, thereby defining the spatial resolution of the spectrometer 100. Alternatively, if the aperture arrays 310/316/318 are removed, the full area of each element/pixel of the detector 314 will define the field of view (and hence the spatial resolution) at the specimen 10. If this field of view is larger than the spatial resolution that is achieved when the aperture array 310 is present, then the spectroscope 100 will have two distinct spatial resolution settings with the use of a single aperture array 310. Since spatial resolution is varied without any need to insert new optical elements or otherwise affect magnification, changes in spatial resolution have no impact on vignetting, and thus a spectroscope 100 designed with minimal vignetting will maintain this benefit as spatial resolution is varied. Additionally, since no new optical elements are required to vary spatial resolution, the spectroscope 100 also avoids the cost and bulk of such elements.

Looking to the illumination side 200 of the spectroscope 100, an additional focus 220 is usefully included between the light source 202 and the source objective element 218 (more specifically, between the folding reflectors 214 and 216 in FIG. 1). This allows the use of a source objective element 218 having a finite conjugate (finite focus), and thus allows a more compact layout between the elements of the illumination side 200 of the device 100. Additionally, if desired, a limiting aperture could be inserted here to limit the area of illumination onto the specimen 10.

The various optical elements of the spectroscope 100 can be selected and arranged by one of ordinary skill in the field of optical design by use of design tools such as ZEMAX optical design software (ZEMAX Development Corporation, Bellevue, Wash., USA). Following is a set of exemplary elements that may be used in the spectroscope 100 shown in FIG. 1:

Focusing reflector 206: Concave spherical mirror with 150 mm focal length, 10 degree off-axis angle, and distance of 155 mm to next surface.

Focusing reflector 208: Concave spherical mirror with 20 mm focal length, 12 degree off axis angle, and distance of 150 mm to next surface.

Focusing reflector 210: Concave spherical mirror with 100 mm focal length, 6 degree off axis angle, and distance of 281 mm to focal plane 220 (the location of which is chosen to match the back focal length of the source objective element 218).

Folding reflectors 212, 214, and 216: Plane mirrors.

Source objective element 218: Uses a Schwarzschild objective from a Thermo Electron Centaurus FT-IR microscope (Thermo Fisher Scientific Inc., Madison, Wis., USA) and adjusting the spacing between its reflectors 218x and 218c for optimal performance at a magnification ratio of 15.

The foregoing optical elements 206, 208, 210, 212, 214, 216, and 218 are used with an interferometer 202 having a light source output aperture (exit pupil) 204 of 38 mm, and which is spaced 250 mm from the focusing reflector 206. The optical elements should be selected with clear apertures sized large enough to capture all of the incident light, preferably even if slightly misaligned. The off-axis spherical reflectors 206, 208, and 210 introduce some astigmatism and aberration, and to some degree conflict with the goal of imaging all apertures on the illumination and collection sides 200 and 300 to the limiting apertures therein. However, aberrations are minimal where the included angles between entrance and exit beams on the reflectors 206, 208, and 210 are chosen to be less than about 30 degrees.

Looking then to the collection side 300 of the spectroscope 100, the following exemplary elements may be used:

Collector objective element 302: Can be chosen to be identical with the source objective element 218.

Folding reflectors 304 and 306: Plane mirrors.

Focusing reflector 308: Toroidal mirror with roughly 188 mm focal length when operated with an off axis angle of 8 degrees. The reflector 308 is located one focal length from the focal plane at 310—which is itself located one focal length from the convex reflector 302x of the collector objective optical element 302—and two focal lengths from the reflector 312x of the camera optical element 312. Thus, the reflector 308 is equidistant from reflectors 302x and 312x (at two focal lengths away), and is adjusted in position to image reflectors 302x and 312x onto one another with unit magnification while collimating the beam after the focal plane at 310.

Camera optical element 312: Uses a Schwarzschild objective with a focal length chosen to provide overall magnification of 1.2 (which is not an essential feature of the design, and is chosen merely to provide a given spatial resolution at the specimen for a selected array detector 314). Critical imaging of mirrors 308 to 309 is preferred in order to minimizing vignetting in the collection optics.

As for the choice of the microscope viewing element 402 and light source 400, their design is trivial, and will depend on the desired configuration for the microscope, e.g., whether the light source 400 is to provide illumination over only the visible range of the spectrum or over other wavelengths instead or as well (e.g., over UV wavelengths); whether the viewing element 402 is to provide direct viewing (monocular or binocular) and/or viewing via electronic image capture (e.g., video capture); and so forth.

The specimen stage 10 may take the form of any suitable specimen stage. Preferably, the specimen stage 10 is motorized to allow translation in two dimensions about the focal plane, and also preferably rotation about the beam axes of the source objective element 218 and/or the collector objective optical element 302.

The aperture arrays 310, 316, 318, etc. can be formed in any suitable manner with any suitable aperture sizes and shapes. The apertures 310a are dimensioned in accordance with the magnification of the collector objective element 302 and the spatial resolution desired, e.g., if the collector objective element 302 has a magnification of 10× and a spatial resolution of 6 microns is desired, the apertures 310a should be 60 microns in diameter. Apertures of this size can be generated, for example, by etching or laser drilling of a metal film. The aperture arrays 310, 316, 318 can each be manually installed when desired, or in a more preferred arrangement, they are provided on a motorized stage which allows a user to index to a desired resolution setting. The stage may bear the aperture arrays 310, 316, 318, etc. in a form similar to that shown in FIG. 1, whereby the stage may be translated until the desired array is in place, or the aperture arrays might be situated in radially-oriented rows on a rotatable stage so that a user may rotate the stage to achieve the desired resolution setting.

The detector 314 may be any suitable detector, such as an array of mercury-cadmium-telluride (MCT) photoconductive elements similar to that used in the Thermo Electron Continuum XL FT-IR microscope (Thermo Fisher Scientific Inc., Madison, Wis., USA).

It is emphasized that a wide variety of other components, layout distances, and general placements are possible, and thus the invention may assume a wide variety of forms other than the exemplary one shown in FIG. 1. This includes the possibility of omitting or combining optical elements (e.g., omitting one or more of the folding reflectors 212, 214, 216, 304 and 306, which are merely included to provide a convenient layout, and/or using two of the focusing reflectors 206, 208, and 210 rather than three), or adding optical elements (such as additional folding mirrors). Additionally, different types of optical elements may generally be used in place of those noted above: lenses might be used in place of reflectors, different types of lenses/reflectors may be used (e.g., toroidal elements might be used in place of spherical ones), and so forth. In this respect, it is noted that the term "Schwarzschild objective" is used throughout this document to refer to dual concave-convex reflector sets, and thus encompasses species of optical elements which are arguably not Schwarzschild elements, if such elements are strictly defined (e.g., Cassegrain elements).

Further, while the spectroscope 100 is shown as using a transmissive mode of operation (with spectra being generated from light transmitted through the specimen 10), a reflective mode could be implemented as well (or instead), as by providing a light source at the location of the microscope viewing element 402, or by inserting a dichroic mirror somewhere along the beam path at the collection side 300 and providing light source input to this mirror.

It is notable that the vignetting reduction features of the invention can be implemented without use of the variable spatial resolution features. For example, the aperture array 310 (as well as the camera optical element 312 and the intermediate elements 306 and 308) might be eliminated, and the collector objective element 302 could simply be used as the camera element for imaging the specimen 10 onto the detector 314 (the detector 314 here being moved to a position near where the aperture array 310 is shown in FIG. 1). Similarly, the variable spatial resolution features of the invention could be implemented without the vignetting reduction features. However, these two aspects of the invention are particularly beneficial when combined, particularly since variable spatial resolution can be attained while preserving the imaging of the limiting apertures of the optics across the collection side 300 of the spectroscope 100 (and more generally, across both the illumination and collection sides 200 and 300). In other words, the invention allows compatibility between variable spatial resolution and anti-vignetting, whereas these features have generally been incompatible in the past.

It should be understood that the version of the invention described above is merely exemplary, and the invention is not intended to be limited to this versions. Rather, the scope of rights to the invention is limited only by the claims set out below, and the invention encompasses all different versions that fall literally or equivalently within the scope of these claims.

What is claimed is:

1. A spectroscope including:
   a. a specimen stage;
   b. a collector objective element receiving light from the specimen stage;
   c. an aperture array having multiple apertures therein, with the apertures each receiving a portion of the light from the collector objective element;
   d. a camera element receiving the light from the aperture array;
   e. a multi-element detector receiving the light from the camera element, with the elements of the detector each receiving an image of a portion of the specimen stage from a respective aperture in the aperture array; and
   f. a viewing optical element receiving light from the collector objective element, wherein the light received by the viewing optical element is at least substantially within the visible spectrum.

2. The spectroscope of claim 1 wherein:
   a. wherein the aperture array bears several apertures, each aperture being identically sized and configured;
   b. further including a supplemental array bearing several apertures which are differently sized from the apertures in the aperture array, wherein the aperture array and supplemental array are mounted to be interchangeably positionable along the same plane.

3. The spectroscope of claim 1 wherein the specimen stage is critically imaged onto the aperture array.

4. The spectroscope of claim 1 wherein:
   a. the collector objective element has a collector objective limiting aperture;
   b. the camera element has a camera limiting aperture; and
   c. at the camera element, the light received from the aperture array has a diameter at least substantially matching the camera limiting aperture.

5. The spectroscope of claim 1 further including an intermediate optical element:
   a. receiving the light from the collector objective element and the aperture array, and
   b. supplying the light to the camera element.

6. The spectroscope of claim 5 wherein the camera element receives collimated light from the intermediate optical element.

7. The spectroscope of claim 5 wherein the aperture array is located at both:
   a. the focus of the collector objective element, and
   b. the focus of the intermediate optical element.

8. The spectroscope of claim 7 further including one or more supplemental arrays, wherein:
   a. the aperture array and supplemental arrays are mounted to be interchangeably positioned at the foci of the collector objective element and the intermediate optical element; and
   b. each array bears apertures which are differently sized from the apertures in the other arrays.

9. The spectroscope of claim 5 wherein the focal length of the intermediate optical element is equal to the focal length of the collector objective element.

10. The spectroscope of claim 5 wherein the path traveled by the light between the intermediate optical element and the camera element has a length equal to the path traveled by the light between the collector objective element and the intermediate optical element.

11. The spectroscope of claim 10 wherein the aperture array is located at the focus of both the collector objective element and the intermediate optical element.

12. The spectroscope of claim 11 wherein the focal length of the intermediate optical element is equal to the focal length of the collector objective element.

13. The spectroscope of claim 1 wherein the light received by the camera element is at least substantially within the infrared spectrum.

14. A spectroscope including:
    a. a specimen stage;
    b. a collector objective element receiving light from the specimen stage;
    c. an intermediate optical element receiving the light from the collector objective element;
    d. a focal plane between the collector objective element and the intermediate optical element, wherein the focal plane is located at the focus of both the collector objective element and the intermediate optical element;
    e. a camera element receiving the light from the intermediate optical element; and
    f. a multi-element detector situated at the image plane and receiving light from the camera element, with each element of the detector receiving an image of a portion of the specimen stage.

15. The spectroscope of claim 14 further including an aperture array at the focal plane, the aperture array having several apertures therein.

16. The spectroscope of claim 15 further including a supplemental array:
    a. interchangeably positionable with the aperture array along the focal plane, and
    b. bearing several apertures which are differently sized from the apertures in the aperture array.

17. The spectroscope of claim 14 wherein the intermediate optical element collimates the light received from the collector objective element.

18. The spectroscope of claim 14 wherein the focal length of the intermediate optical element is equal to the focal length of the collector objective element.

19. The spectroscope of claim 14 wherein the path traveled by the light between the intermediate optical element and the camera element has a length equal to the path traveled by the light between the collector objective element and the intermediate optical element.

20. The spectroscope of claim 19 wherein the focal length of the intermediate optical element is equal to the focal length of the collector objective element.

21. The spectroscope of claim 14:
    a. wherein the light received by the camera element is at least substantially within the infrared spectrum; and b. further including a viewing optical element receiving light from the specimen stage, wherein the light received by the viewing optical element is at least substantially within the visible spectrum.

22. The spectroscope of claim 21 wherein the viewing optical element receives light from the specimen stage via the collector objective element.

23. A spectroscopic method for use in a spectroscope wherein the spectroscope includes:
   i. a specimen stage;
   ii. a collector objective element receiving light from the specimen stage;
   iii. a camera element receiving light from the collector objective element; and
   iv. a multi-element detector receiving the light from the camera element, the method including the steps of:
      a. situating a first aperture array to receive light from the collector objective element and provide light to the camera element, wherein the first aperture array has multiple apertures therein, with each aperture receiving an image of a portion of the specimen stage from the collector objective element;
      b. obtaining readings from the detector elements, wherein each detector element's reading is dependent on an image of a portion of the specimen stage received from one of the apertures in the first aperture array;
      c. situating a second aperture array to receive light from the collector objective element and provide light to the camera element, wherein the second aperture array has multiple apertures therein which are differently sized than the apertures of the first aperture array, with each aperture receiving an image of a portion of the specimen stage from the collector objective element;
      d. obtaining readings from the detector elements, wherein each detector element's reading is dependent on an image of a portion of the specimen stage received from one of the apertures in the second aperture array.

24. The spectroscopic method of claim 23 further including the steps of:
   a. directing at least a portion of the light from the collector objective element to a viewing optical element, and
   b. visually viewing the light through the viewing optical element.

* * * * *